(12) United States Patent
Uprit (10) Patent No.: US 12,086,793 B2
(45) Date of Patent: Sep. 10, 2024

(54) IMPLEMENTING NON-FUNGIBLE TOKENS AND A DISTRIBUTED TRUST COMPUTING NETWORK FOR PURPOSES OF ASSESSING RESOURCE VOLUME OF CONTENTS STORED IN A SECURE CONTAINER

(71) Applicant: BANK OF AMERICA CORPORATION, Charlotte, NC (US)

(72) Inventor: Saurabh Uprit, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 401 days.

(21) Appl. No.: 17/680,656

(22) Filed: Feb. 25, 2022

(65) Prior Publication Data

US 2023/0274260 A1    Aug. 31, 2023

(51) Int. Cl.
*G06Q 20/36* (2012.01)
*G06Q 20/02* (2012.01)
*G06Q 20/38* (2012.01)
*H04L 9/32* (2006.01)

(52) U.S. Cl.
CPC .......... *G06Q 20/367* (2013.01); *G06Q 20/02* (2013.01); *G06Q 20/38215* (2013.01); *H04L 9/3213* (2013.01); *G06Q 2220/165* (2013.01); *H04L 2209/56* (2013.01); *H04L 2209/603* (2013.01)

(58) Field of Classification Search
CPC .................... G06Q 20/00–425; H04L 9/00–50
See application file for complete search history.

(56) References Cited

U.S. PATENT DOCUMENTS

| | | | | |
|---|---|---|---|---|
| 10,505,726 | B1 * | 12/2019 | Andon | H04L 9/0866 |
| 2014/0107836 | A1 * | 4/2014 | Crews | G07F 19/209 |
| | | | | 700/236 |
| 2015/0363778 | A1 * | 12/2015 | Ronca | G06Q 20/4016 |
| | | | | 705/71 |
| 2018/0268637 | A1 * | 9/2018 | Kurian | G07D 11/20 |

* cited by examiner

*Primary Examiner* — Ari Shahabi
(74) *Attorney, Agent, or Firm* — Moore & Van Allen PLLC; James C. Edwards (57) ABSTRACT

Intelligent assessment of the resource volume associated with physical objects stored in a secure container. Digital images of the contents/physical objects and evidentiary artifacts associated with the objects are captured and used to assess an initial resource volume. In specific embodiments, Non-Fungible Token(s) are generated using the digital image and the initial resource volume as inputs. Subsequently, nodes of a distributed trusts computing network are tasked with determining a current resource advancement volume for the NFT(s) based on the current demand, current resource advancement providers assessment and the initial resource volume. As a result of the present invention, a secure container holder or entity having an interest in the contents of the secure container is able to take otherwise idle property (i.e., the contents/objects in the secure container) and use them to create a tradeable commodity in the form of an NFT and/or leverage resource liquidity.

12 Claims, 5 Drawing Sheets

IMPLEMENTING NON-FUNGIBLE TOKENS AND A DISTRIBUTED TRUST COMPUTING NETWORK FOR PURPOSES OF ASSESSING RESOURCE VOLUME OF CONTENTS STORED IN A SECURE CONTAINER

FIELD OF THE INVENTION

The present invention is related to resource volume assessment and, more specifically, assessing resource volume associated with the contents of a secure container.

BACKGROUND

Secure containers, such as safety deposit/locker boxes and the like are used to store valuable physical objects, such as important documents (e.g., wills, deeds and the like), coin and/or stamp collections, precious gems, jewelry and the like. While objects such as coin and/or stamp collections, precious gems and jewelry have value, they are considered as idle property since they have no immediate value in a user's daily financial transactions or net worth. Furthermore, since such property is not federally insured, the user assumes the peril of losing any value if the objects are somehow destroyed or misappropriated by a wrongdoer.

Therefore, a need exists to develop systems, methods and the like for converting the valuable contents of a safety locker box to a commodity that is both tradeable and that can be used to leverage cash liquidity based on the valuation of the objects of the safety locker box, while the ownership of the contents remains with the user and the safety locker box remains in custody of the trusted entity (e.g., financial institution).

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for intelligent assessment of the resource volume associated with objects stored in a secure container. In this regard, the invention not only provides for assessing the sovereign/FIAT resource volume of the contents of the secure container, but also provides an ongoing assessment of the current resource advancement volume for purposes of using the content as a surety in securing a resource advancement.

In specific embodiments of the invention, the Non-Fungible Tokens are created from digital images of the contents that have undergone sovereign/FIAT resource volume assessment and the NFTs are transmitted to a distributed trust computing network (e.g., HOLOCHAIN® or the like) for further assessment, by the decentralized of the current resource advancement volume. Once the current resource advancement volume is assessed, in additional embodiments of the invention, the distributed trust computing network can provide a platform for resource advancement submissions from nodes associated with resource advancement providers and decisioning of the resource advancement submissions to determine which resource advancement provider will provide a resource advancement to a secure container holder and another entity having an interest in the contents of the secure container.

As a result of the present invention, a secure container holder or entity having an interest in the contents of the secure container is able to take otherwise idle property (i.e., the contents/objects in the secure container) and use them to create a tradeable commodity (i.e., an NFT) and leverage resource liquidity based on the valuation of the entire contents and/or individual objects in the safety locker box, or in some embodiments the NFT associated with the valued contents or individual objects in the secure container.

A system for assessing resource volume of contents stored in a secure container, defines first embodiments of the invention. The system includes a secure container (e.g., safety deposit/locker box or the like) including one or more physical objects stored in the secure container. The system additionally includes an image-capturing apparatus configured to periodically capture (i) one or more first digital images of the one or more physical objects stored in the secure container (i.e., the contents of the secure container), and (ii) one or more second digital images of evidentiary objects configured to support a resource volume assessment of at least one of the one or more physical objects.

In addition, the system includes a computing platform having a first memory and one or first processing device processors in communication with the first memory. The first memory stores a first resource volume assessment engine executable by at least one of the one or more first processing device. The first resource volume assessment engine is configured to (i) receive the one or more first digital images and one or more second digital images, (ii) implement one or more object recognition algorithms to identify the one or more physical objects in the one or more first digital images, (iii) tag the one or more physical objects in the one or more first digital images based on the identification, and (iv) determine at least one initial resource volume (e.g., a sovereign or FIAT valuation or the like) for the one or more physical objects based at least on the evidentiary objects in the one or more second digital images. In addition the first memory stores a second resource volume assessment engine that executable by at least one of the one or more first processing device and configured to (i) receive the tagged one or more first digital images, the one or more second digital images, and the at least one initial resource volume for the one or more physical objects, (ii) determine at least one current resource volume (e.g., a current resource advancement (i.e., loan) valuation) for the one or more physical objects based at least on (a) current demand for the one or more physical objects, (b) current resource advancement entity evaluation of the one or more physical objects, and (c) the initial resource volume of the one or more physical objects.

In specific embodiments the system further includes a distributed trust computing network including a plurality of decentralized nodes, each decentralized node having a second memory and at least one second processing device in communication with the second memory. The second memory of the decentralized nodes is configured to store a distributed register/ledger that comprises a plurality of data blocks that store data. The distributed trust computing network is configured to certify that the data stored in the data blocks is authentic and unaltered. According to embodiments of the system, the second processing devices of a first plurality of the decentralized nodes are configured to execute the second resource volume assessment engine to determine the at least one current resource volume for the one or more physical objects. In related embodiments of the system, the first memory further stores a Non-Fungible Token (NFT) generator engine executable by at least one of the one or more first processing devices and configured to (i) generate NFT(s) that uses as, at least a portion of, the input file (a) at least one of the one or more first digital images, and (b) the at least one initial resource volume for the one or more physical objects, and in response to generating the NFT(s), (ii) transmit the NFT(s) to the distributed trust computing network. In response to receiving the NFT(s), the distributed trust computing network stores the NFT(s) as a data block within the distributed register/ledger. In such embodiments of the system, the second processing devices of the first plurality of the decentralized nodes of the distributed trust computing network are configured to execute the second resource volume assessment engine to determine the at least one current resource volume for each of the NFTs.

In other embodiments of the invention that implement the distributed trust computing network, the second memory of the distributed trust computing network may store a resource advancement submission and determiner engine that is executable by a second plurality of the decentralized nodes and is configured to (i) receive one or more resource advancement submissions/bids, from decentralized nodes associated resource advancement providers, for a resource advancement that relies on the current resource volume for the one or more physical objects stored in the secure container as surety, and (ii) determine a resource advancement provider from amongst the one or more resource advancement submissions for providing the resource advancement. In other related embodiments of the system, the second memory of distributed trust computing network stores a resource advancement issuance engine that is executable by at least one of the decentralized nodes and is configured to (i) provide the resource advancement to an entity having an interest in the physical objects stored in the secure container, and (ii) issue requisite resource advancement artifacts to the resource advancement provider and the entity.

In other specific embodiments of the system, the second resource volume assessment engine is further configured to (iii) continuously track the at least one current resource volume for the one or more physical objects and, in response to determining a decrease in resource volume for at least one of the physical objects, (iv) determine whether an outstanding resource advancement relying on the resource volume of at least one of the physical objects stored in the secure container as surety requires a demand for resources based on the decrease in resource volume.

A computer-implemented method for assessing resource volume of contents stored in a secure container defines second embodiments of the invention. The computer-implemented method is executed by one or more computing processor devices. The method includes capturing, by an image-capturing apparatus, (i) one or more first digital images of one or more physical objects stored in a secure container, and (ii) one or more second digital images of evidentiary objects configured to support a resource volume assessment of at least one of the one or more physical objects. At a first resource volume assessment engine, the method further includes (i) receiving the one or more first digital images and one or more second digital images, (ii) implementing one or more object recognition algorithms to identify the one or more physical objects in the one or more first digital images, (iii) tagging the one or more physical objects in the one or more first digital images based on the identification, and (iv) determining at least one initial resource volume for the one or more physical objects based at least on the evidentiary objects in the one or more second digital images. At a second resource volume assessment engine, the method further includes, (i) receiving the tagged one or more first digital images, the one or more second digital images, and the at least one initial resource volume for the one or more physical objects, and (ii) determining at least one current resource volume for the one or more physical objects based at least on (a) current demand for the one or more physical objects, (b) current resource advancement entity evaluation of the one or more physical objects, and (c) the initial resource volume of the one or more physical objects.

In specific embodiments of the method, the second resource assessment engine is executed by at least one processing device in a plurality of decentralized nodes in a distributed trust computing network to determine the at least one current resource volume for the one or more physical objects. In such embodiments the method may further include generating at least one NFT that uses as, at least a portion of, the input file (i) at least one of the one or more first digital images and (ii) the at least one initial resource volume for the one or more physical objects and, in response to generating the NFT(s), transmitting the NFT(s) to the distributed trust computing network and storing the NFTs as a data block within a distributed register of the distributed trust computing network. In further related embodiments of the method, determining at least one current resource volume further comprises determine the at least one current resource volume for each of the NFT(s).

In other embodiments, in which the second resource assessment engine is executed by decentralized nodes in a distributed trust computing network, the method may further include receiving, at one or more decentralized nodes, one or more resource advancement submissions for a resource advancement that relies on the current resource volume for the one or more physical objects stored in the secure container as surety, and, in response to receiving the resource advancement submissions, determining a resource advancement provider from amongst the one or more resource advancement submissions for providing the resource advancement. In further related embodiments, the method further includes providing the resource advancement to an entity having an interest in the physical objects stored in the secure container and issuing requisite resource advancement artifacts to the resource advancement provider and the entity.

In other specific embodiments the method further includes tracking the at least one current resource volume for the one or more physical objects and, in response to determining a decrease in resource volume for at least one of the physical objects, determining whether an outstanding resource advancement relying on the resource volume of at least one of the physical objects stored in the secure container as surety requires a demand for resources based on the decrease in resource volume.

A computer program product including a non-transitory computer-readable medium defines third embodiments of the invention. The computer-readable medium includes a first set of codes for causing an image-capturing apparatus to capture (i) one or more first digital images of one or more physical objects stored in a secure container, and (ii) one or more second digital images of evidentiary objects configured to support a resource volume assessment of at least one of the one or more physical objects. Further, the computer-readable medium includes a second set of codes for causing a computer to (i) receive the one or more first digital images and one or more second digital images, (ii) implement one or more object recognition algorithms to identify the one or more physical objects in the one or more first digital images, (iii) tag the one or more physical objects in the one or more first digital images based on the identification, and (iv) determine at least one initial resource volume for the one or more physical objects based at least on the evidentiary objects in the one or more second digital images. Additionally, the computer-readable medium includes a third set of codes for causing a computer to (i) receive the tagged one or more first digital images, the one or more second digital images, and the at least one initial resource volume for the one or more physical objects, and (ii) determine at least one current resource volume for the one or more physical objects based at least on (a) current demand for the one or more physical objects, (b) current resource advancement entity evaluation of the one or more physical objects, and (c) the initial resource volume of the one or more physical objects.

In specific embodiments of the computer program product, the third set of codes is executed by at least one processing device in a plurality of decentralized nodes in a distributed trust computing network to determine the at least one current resource volume for the one or more physical objects. In such embodiments of the computer program product, the computer-readable medium further includes a fourth set of codes for causing a computer program product to (i) generate at least one NFT that uses as, at least a portion of, the input file (a) at least one of the one or more first digital images and (b) the at least one initial resource volume for the one or more physical objects, and (ii) transmit the at least one NFT to the distributed trust computing network. In such embodiments of the computer program product, the third set of codes is further configured to store the at least one NFT as a data block within a distributed register of the distributed trust computing network. In related embodiments of the computer program product, the third set of codes is further configured to cause the computer to determine the at least one current resource volume for each of the at least one NFTs.

In further embodiments of the computer program product, the computer-readable medium further includes a fourth set of codes for causing a computer to (i) receive one or more resource advancement submissions, from decentralized nodes of the distributed trust computing network that are associated resource advancement providers, for a resource advancement that relies on the current resource volume for the one or more physical objects stored in the secure container as surety, and (ii) determine a resource advancement provider from amongst the one or more resource advancement submissions for providing the resource advancement. In addition, the computer-readable medium includes a fifth set of codes for causing a computer to (i) provide the resource advancement to an entity having an interest in the physical objects stored in the securer container, and (ii) issue requisite resource advancement artifacts to the resource advancement provider and the entity.

In additional specific embodiments of the computer program product, the computer-readable medium further includes a fourth set of codes for causing a computer to (i) track the at least one current resource volume for the one or more physical objects and, in response to determining a decrease in resource volume for at least one of the physical objects, and, in response to the tracking (ii) determine whether an outstanding resource advancement relying on the resource volume of at least one of the physical objects stored in the secure container as surety requires a demand for resources based on the decrease in resource volume.

Thus, according to embodiments of the invention, which will be discussed in greater detail below, the present invention provides for intelligent assessment of the resource volume associated with objects stored in a secure container. In this regard, the invention not only provides for assessing the sovereign/FIAT resource volume of the contents of the secure container, but also provides an ongoing assessment of the current resource advancement volume for purposes of using the content as a surety in securing a resource advancement. As a result of the present invention, a secure container holder or entity having an interest in the contents of the secure container is able to take otherwise idle property (i.e., the contents/objects in the secure container) and use them to create a tradeable commodity (i.e., an NFT) and leverage resource liquidity based on the valuation of the NFT, the entire contents and/or individual objects in the safety locker box.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide an intelligent means for assessing the value (otherwise referred to herein as the "resource volume") of contents (otherwise referred to herein as "objects") of a safety locker/deposit box (otherwise referred to herein as a "secure container") for purposes of leveraging the value for cash (e.g., resource) liquidity.

Specifically, one or more digital images are periodically obtained of the contents of a safety locker/deposit box, as well as digital images of supporting evidentiary documents related to valuation, such as receipts, valuation certificates and the like. The digital images of both the contents of the safety locker and the supporting evidentiary documents are fed into an Artificial Intelligence (AI)-based sovereign/FIAT valuation engine, which is configured to implement object-recognition algorithms to identify and tag the objects in the digital image(s) of the contents of the safety/locker. Once identified, the engine is configured to determine sovereign/FIAT valuation of the contents based, at least, on the evidentiary documentation.

In specific embodiments of the invention, one or more Non-Fungible Tokens (NFT) are generated using, as inputs to the NFT generation algorithm(s), the image of the contents of the safety locker/deposit box and the sovereign/FIAT valuation outputted from the AI engine. Once generated, the NFT(s) are communicated to a distributed trust computing network, such as a HOLOCHAIN® network or the like. Specific value assessment nodes of the distributed trust computing network will further assess the current lending (otherwise referred to herein as "resource advancement") value of the contents taking into account (i) the sovereign/FIAT valuation of the contents/object, (ii) current supply and demand for the contents/object, (iii) current lending practices (i.e., how pool lenders currently valuate the contents/object, and the like. In this regard, the current lending value may be higher or lower value than the sovereign/FIAT value. In specific embodiments of the invention, the lending value of the contents/objects will be determined by the nodes on a continual basis, taking into account that the sovereign/FIAT valuation may change (based on additional/removal of objects from the security locker box or the like) and changes in the current supply/demand and current lending practices.

Additional nodes of the distributed trust computing network may comprise lending nodes, which form the lending pool and are configured to determine whether or not to lend and, if they determine to lend, the bid for providing the loan, up to the lending value as surmised by the value assessment nodes. In addition, other nodes of the distributed trust computing may comprise a bidding/lending node configured for orchestrating the loan bidding process and one or more loan providing nodes configured for (i) distributing proceeds to the loanee, which may be the holder of the security locker box or in other instances, another entity having an interest in the contents of the security locker box, and (ii) issuing instruments like lending, lease to enable the liquidity for lender.

As result of the present invention, a security locker box holder or a party having interest in the contents of the security locker box is able to take otherwise idle property and use them to leverage cash liquidity based on the valuation of the contents and/or individual objects in the safety locker box.

Figure 1:
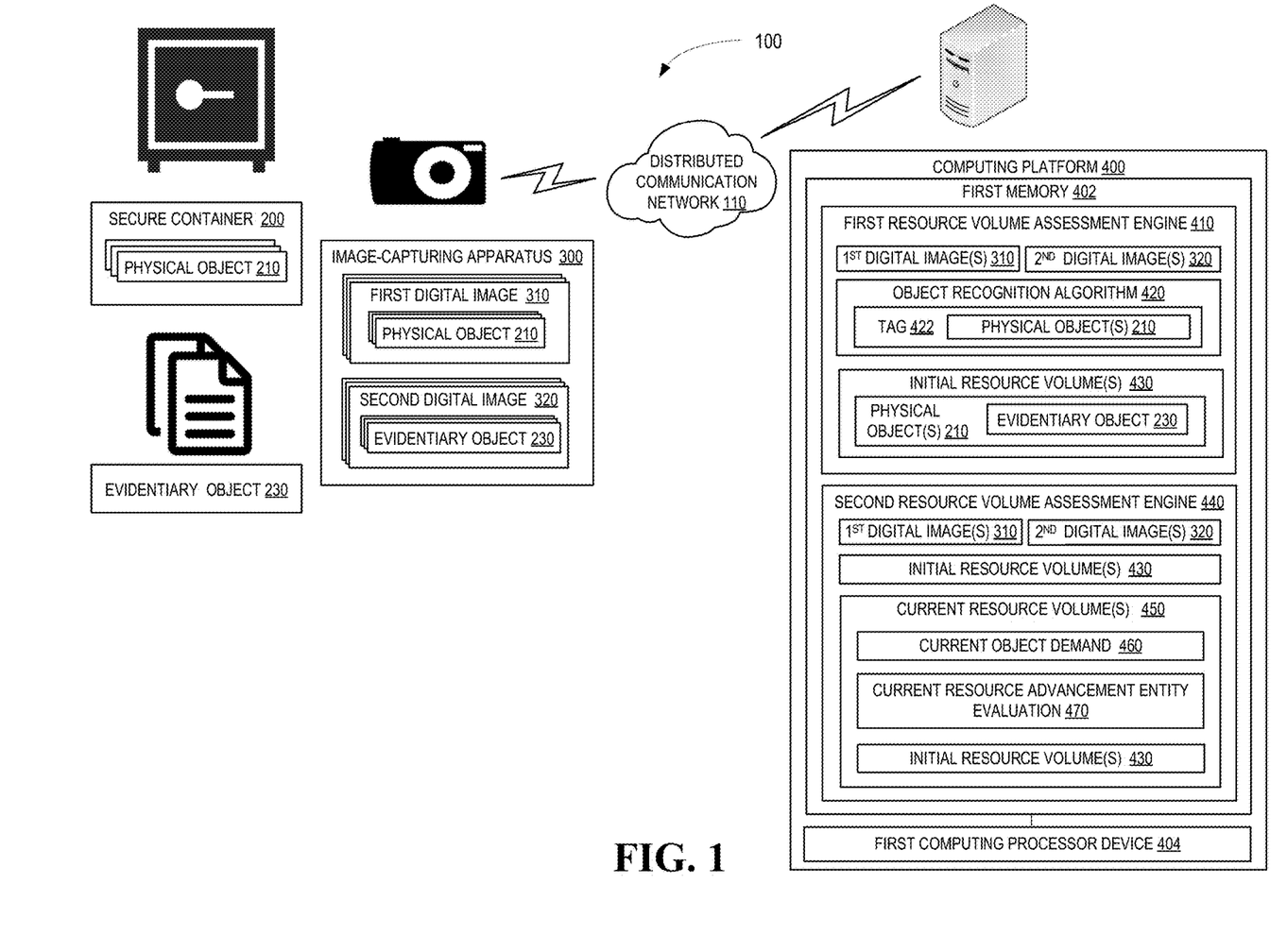
FIG. 1 is a schematic diagram of a system for resource volume assessment of the contents of a secure container, in accordance with some embodiments of the present disclosure.

Turning now to the figures, FIG. 1 a schematic diagram is provided of a system 100 for assessing resource volume of physical objects stored in a secure container, in accordance with embodiments of the present invention. The system 100 is implemented within a distributed communication network 110, which may include one or more cellular networks, the Internet, one or more intranets, or the like. The system 100 includes secure container 200 which stores one or more physical objects 210 of value. The secure container 200 is otherwise referred to as a safety locker box or a safety deposit box. The physical objects 210 may include, but are not limited to, jewelry, gems, collectible items or the like.

The system 100 additionally includes an image-capturing apparatus 300 configured to capture (i) one or more first digital images 310 of the physical objects 210 (i.e., contents) of the secure container 200, and (ii) one or more second digital images 320 of evidentiary objects 230 (e.g., documents, certificates and the like) configured to support a resource volume assessment of the physical objects 210. In specific embodiments of the invention, at least a portion of, the image-capturing apparatus 300 includes an image-capturing device affixed to the interior of the secure container 200, such that first digital images 310 may be captured on a continuous, periodical basis to account for changes in the physical objects (i.e., adding or removing objects) and verification of continual existence of the physical objects 210 in the secure container 200. In other embodiments of the invention, all or a portion of the image-capturing device 300 comprises a stand-alone image-capturing device. In specific embodiments of the invention, first digital image(s) 310 may comprise a single digital image of the entire contents (i.e., all objects) of the secure container 200, while in other embodiments of the invention, first digital image 310 may comprise multiple digital images, with each digital image comprising a single physical object 210 stored in the secure container 200 and/or different spatial views of the content of the secure container 200.

The system additionally includes computing platform 400 having a first memory 402 and at least one first computing processor devices 404 in communication with first memory 402. Computing platform 400 may comprise one or multiple computing devices, such as servers, storage units and the like. First memory 402 may comprise volatile and non-volatile memory, such as read-only and/or random-access memory (RAM and ROM), EPROM, EEPROM, flash cards, or any memory common to computing platforms. Moreover, first memory 402 may comprise cloud storage, such as provided by a cloud storage service and/or a cloud connection service. First computing processor device(s) 404 may be an application-specific integrated circuit ("ASIC"), or other chipset, logic circuit, or other data processing device. First computing processor device(s) 404 may execute one or more application programming interface (APIs) (not shown in FIG. 1) that interface with any resident programs, such as first and second resource volume assessment engines 410, 440 or the like, stored in first memory 402 of computing platform 400 and any external programs. Further, first computing processor devices(s) 404 may include various processing subsystems (not shown in FIG. 1) embodied in hardware, firmware, software, and combinations thereof, that enable the functionality of computing platform 400 and the operability of computing platform 400 on the distributed computing network 110. For example, processing subsystems allow for initiating and maintaining communications and exchanging data with other networked devices. For the disclosed aspects, processing subsystems of first computing processor device(s) 404 may include any subsystem used in conjunction with first and second resource volume assessment engines 410, 440 and related tools, routines, subroutines, algorithms, sub-algorithms, sub-modules thereof.

Figure 2:
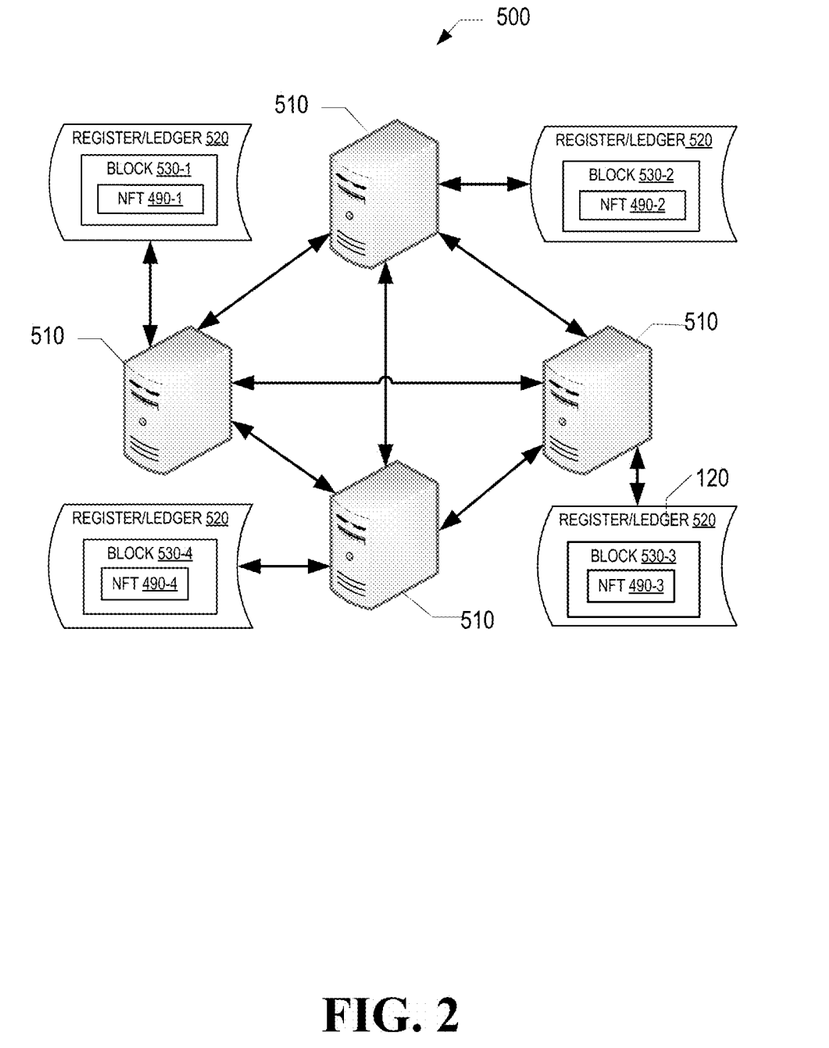
FIG. 2 is a schematic diagram of an exemplary distributed trust computing network, in accordance with some embodiments of the present disclosure.

Computing platform 400 may additionally include a communications module (not shown in FIG. 1) embodied in hardware, firmware, software, and combinations thereof, that enables electronic communications between the computing platform 400 and other networks and network devices, such as image-capturing apparatus 300 and, in some embodiments of the system, distributed trust computing network 500 (shown in FIG. 2). Thus, communication module may include the requisite hardware, firmware, software and/or combinations thereof for establishing and maintaining a network communication connection with one or more devices and/or networks.

First memory 402 of computing platform 400 includes first resource volume assessment engine 410 that is executable by one or more of the first computing processor devices 404 and configured to receive the first digital images 310 and the second digital images 320 and implement one or more object recognition algorithms 420 to identify the physical objects 210 in the first digital images 310 and tag 422 the physical objects 210 in the first digital images 310 with their corresponding identification. Further, first resource volume assessment engine 410 that is configured to determine an initial resource volume 430, otherwise referred to herein as a sovereign/FIAT valuation, for each of the physical objects 210 or all of the physical objects 210 stored in the secure container 200 based, at least, on the identification of the physical objects and the evidentiary objects 230 in the second digital images 320. In other embodiments of the invention, other information is harvested for a determination of the initial resource volume.

Figure 3:
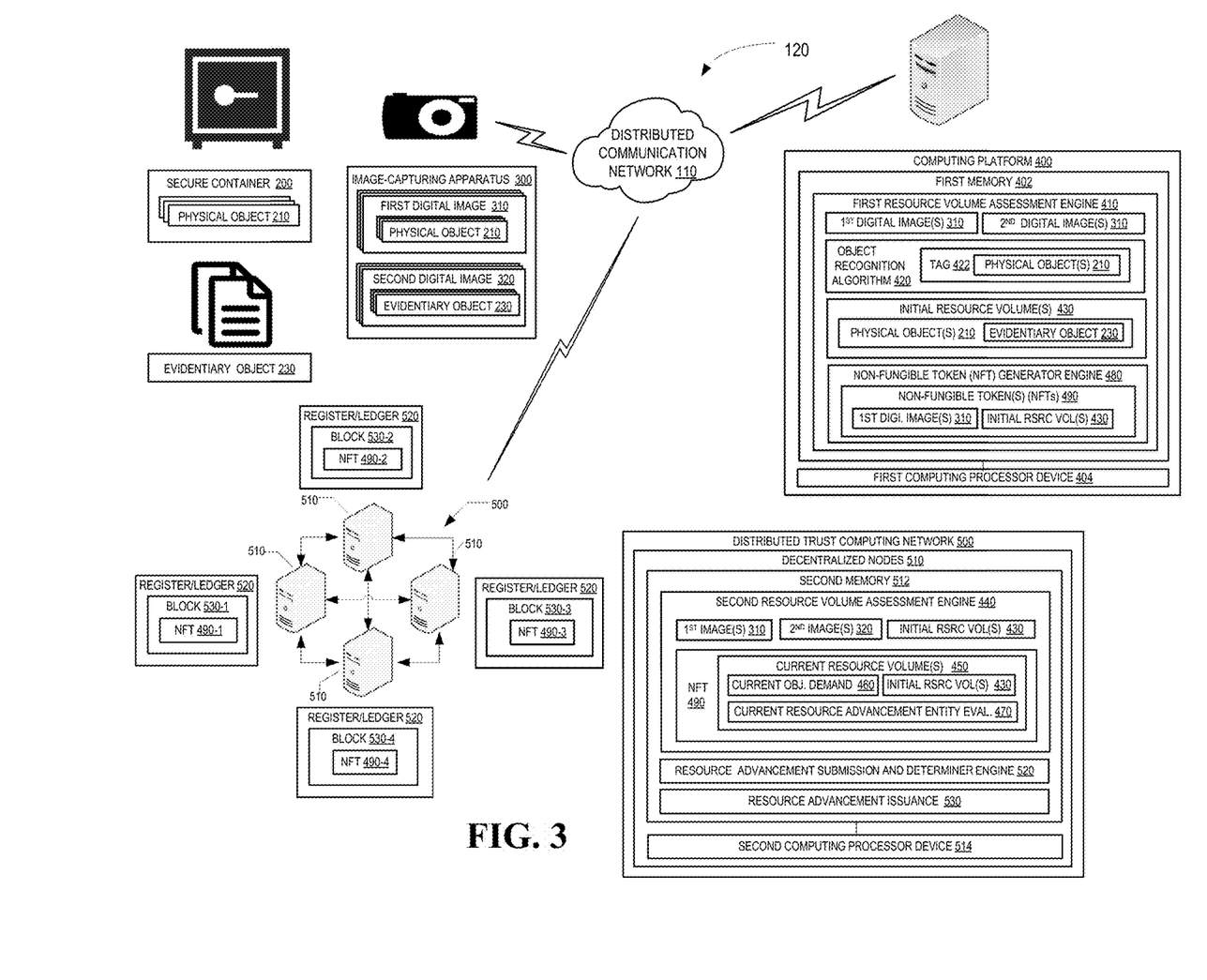
FIG. 3 is a block diagram of an alternate system for resource volume assessment of the contents of a secure container and resource advancement leveraging Non-Fungible Tokens (NFTs) and a distributed trust computing network, in accordance with some embodiments of the present disclosure.

Additionally, first memory 402 of computing platform 400 includes second resource volume assessment engine 440 that is executable by one or more of the first computing processor devices 404 and, which as described in relation to FIG. 3, in some embodiments of the invention, may be executed within a distributed trust computing network 500 (shown in FIG. 3). Second resource volume assessment engine 440 is configured to receive the tagged first digital images 310, the second digital images 320 and the initial resource volume 430 or, in some embodiments, as described in relation to FIG. 3, Non-Fungible Token(s) (NFT(s)) associated with the contents or individual physical objects in the secure container. In response to receiving the aforementioned, second resource volume assessment engine 440 is configured to determine current resource volume(s) 450, otherwise referred to as a current resource advancement volume or current maximum lending amount, for the contents/physical objects 210 in the secure container 200. The current resource volume 450 is determined based, at least, on (i) current demand, and in some embodiments supply, of the physical object(s), (ii) current resource advancement entity evaluation, otherwise referred as lender pool evaluation, of the physical objects and (iii) the initial resource volume of the physical objects.

As previously noted, in some embodiments of the invention, in which the resource advancement assessment of the physical objects is materialized in an NFT, the second resource volume assessment engine 440 may be executed within a distributed trust computing network 500. Referring to FIG. 2, a schematic diagram is provided of an exemplary distributed trust computing network 500 otherwise referred to herein as a blockchain network or "block chain", in accordance with embodiments of the present invention. In specific embodiments of the invention, the distributed trust computing network may be a HOLCHAIN® network or the like. The distributed trust computing network 100 includes a distributed database that maintains, e.g., a list of data records, or the like. The security of the data maintained within the trust network is enhanced by the distributed nature of the network. The distributed trust computing network 100 typically includes several decentralized nodes 510, which may be one or more systems, machines, computers, databases, data stores or the like operably connected with one another. In some instances, each of the decentralized nodes 510 or multiple decentralized nodes 510 are maintained by different entities. A distributed trust computing network 500 typically works without a central repository or single administrator. One well-known application of a distributed trust computing network is the public ledger of transactions for cryptocurrencies such as used in bitcoin. The data records recorded in the distributed trust computing network 500 are enforced cryptographically and stored on the decentralized nodes 100 of the block chain.

A distributed trust computing network 500 provides numerous advantages over traditional storage networks/databases. A large number of nodes 510 of a trust network may reach a consensus regarding the validity of data maintained within a 530 block (i.e., data block) of the trust network 500. Additionally, when multiple versions of a data record exist on the register 520, otherwise referred to as a ledger, multiple decentralized nodes 510 can converge on the most up-to-date version of the data record, such that the most-up-to-date version of the data record is the only version that is deemed validated. For example, any decentralized node 510 within the distributed trust computing network 500 that stores a data record can determine within a level of certainty whether the record can be authenticated/authorized to take place and become final by confirming that no conflicting data records are confirmed by the distributed trust computing network 500 elsewhere.

The distributed trust computing network 500 typically has two primary types of data records. The first type is the record type, which consists of the actual data stored in a block 530 within a distributed register 520. The second type is the block type, which are records that confirm when and in what sequence certain events became recorded as part of the distributed register 520. Data records and the events associated therewith are created by participants using the distributed trust computing network 500 in its normal course of business, for example, when data record is received, a block(s) 530 is created by users known as "miners" who use specialized software/equipment to create blocks 530. Holders (also, referred to as users) of a block 530 of the distributed trust computing network agree to store a record within the distributed trust computing network 500 and the related records are passed around to various nodes 510 of the distributed trust computing network 500. A "valid" record or related event is one that can be validated based on a set of rules that are defined by the particular system implementing the distributed trust computing network 500.

A distributed trust computing network 500 is decentralized—meaning that a distributed register 520 (i.e., a decentralized register/ledger) is maintained on multiple nodes 510 of the distributed trust computing network 500. One decentralized node 510 in the distributed trust computing network 500 may have a complete or partial copy of the entire register 520 or set of records and/or blocks 530 on the distributed trust computing network 500. Events are initiated at a decentralized node 510 of a distributed trust computing network 500 and communicated to various other decentralized nodes 510 of the distributed trust computing network 500. Any of the decentralized nodes 510 can validate a record or an associated event, add the record or the details of the storage event to its copy of the distributed register 520, and/or broadcast the record or details of the storage event, its associated validation (in the form of a block 530) and/or other data to other decentralized nodes 510. The distributed trust computing network 500 shown in FIG. 2 is configured to perform one or more of the steps or functions performed by the system shown in FIG. 3.

Referring to FIG. 3, a schematic diagram is depicted of an alternate system 120 for resource volume assessment of the contents of a secure container and resource advancement leveraging Non-Fungible Tokens (NFTs) and a distributed trust computing network, in accordance with some embodiments of the present disclosure. In accordance with embodiments of the system, first memory 402 of computing platform 400 stores Non-Fungible Token (NFT) generator engine 480 that is configured to generate one or more NFTs 490 that use as, at least a portion of the input file to the NFT generator algorithm(s) (i) the first digital image(s) 310 of the physical objects 210 and (ii) the initial resource volume 430 determined by the first resource volume assessment engine 410. The NFTs 490 are a tradeable commodity that represent the resource advancement volume (i.e., the loan valuation). In specific embodiments of the invention, the NFTs may be generated using the ERC-721 (Ethereum Request for Comments 721) standard. Once generated, NFT generator engine 480 is configured to transmit the NFTs 490 to the distributed trust computing network 500.

The distributed trust computing network 500 includes a plurality of decentralized nodes 510, each node 510 having a second memory 512 and at least one second computing processor device 514 in communication with the second memory 512. Second memory 512 of the decentralized nodes 510 stores at least one distributed register/ledger 520 that comprises a plurality of data blocks 530 (e.g., as shown in FIG. 3, 530-1, 530-2, 530-3 530-4 and the like). The distributed trust computing network is configured to certify that the data, in this instance the NFTs 490, stored in the data blocks 530 is authentic and unaltered. In such embodiments of the system 120, the second computing processor devices 514 of, at least a portion of, the decentralized nodes 510 is configured to execute the second resource volume assessment engine 440 to determine the current resource volume 450 of the NFT 490, otherwise referred to as a current resource advancement volume or current maximum lending amount, for the contents/physical objects 210 in the secure container 200.

In further embodiments of the system 120, the second memory 512 of the distributed trust computing network 500 stores resource advancement submission and determiner engine 520 that is executable by at least one of the second computing processor devices 514 (i.e., at least one decentralized node 510). Resource advancement submission and determiner engine 520 is configured to receive one or more resource advancement submissions (e.g., lender bids) from decentralized nodes 510 associated with resource advancement providers (e.g., a pool of lenders) for a resource advancement (e.g., loan) that relies on the previously determined current resource advancement volume 490 (e.g., maximum lending amount) of the physical objects 210 in the secure container or the NFT 490 as surety/collateral. In response to receiving the resource advancement submissions, resource advancement submission and determiner engine 520 is further configured to determine a resource advancement provider (e.g., a lender) from amongst the one or more resource advancement submissions for providing the resource advancement to an entity having an interest in the physical objects (e.g., the holder of the secure container or a party having a security interest in at least one of the physical objects). It should be noted that the resource advancement may use as the entire contents of the secure container 200 as surety/collateral or, in some instances, less than all of the contents (e.g., one physical object 210 or multiple physical objects 210 in the secure container 200.

In further embodiments of the system, the second memory 512 of the distributed trust computing network 500 stores resource advancement issuance engine 530 that is executable by at least one of the second computing processor devices 514 (i.e., at least one decentralized node 510). Resource advancement issuance engine 530, which is executed by a lending node (e.g., a node 510 associated with a financial institution or other lending entity) is configured to provide the resource advancement to the entity making the resource advancement (i.e., the entity having the interest in the physical objects stored in the secure container) and issue requisite resource advancement artifacts (e.g., loan documents and the like) to the resource advancement provider (e.g., lender) and the entity making the resource advancement. In such embodiments of the system 120, the resource advancement artifacts may be stored within data blocks 530 of the distributed register 520 and, thus, are verified as authenticate and unaltered documents through convergence of multiple decentralized nodes 510.

In specific embodiments of the invention, second resource volume assessment engine 440 is configured to track, over time, the current resource volume 450 of the physical objects 210 and/or NFT 490. In other words, second resource volume assessment engine 440 is configured to run on periodically on a predetermined schedule or on-demand. Such, tracking takes into account the fact that the contents of the secure container 200 may change over time and/or that physical objects 210 in the secure container 200 may appreciate or depreciate in value over time. In response to (i) the second resource volume assessment engine 440 determining a decrease in the resource volume (e.g., physical object(s) 210 having been removed from the secure container 200 or a depreciation in value of physical object(s) and (ii) identifying an outstanding resource advancement (e.g., loan) that relies on the resource volume of at least one of the physical objects determined to have a decrease in resource volume, a demand for resources may be determined and made to the entity holding the resource advancement based on the decrease in resource volume of the contents or physical objects stored in the secure container or NFT.

Figure 4:
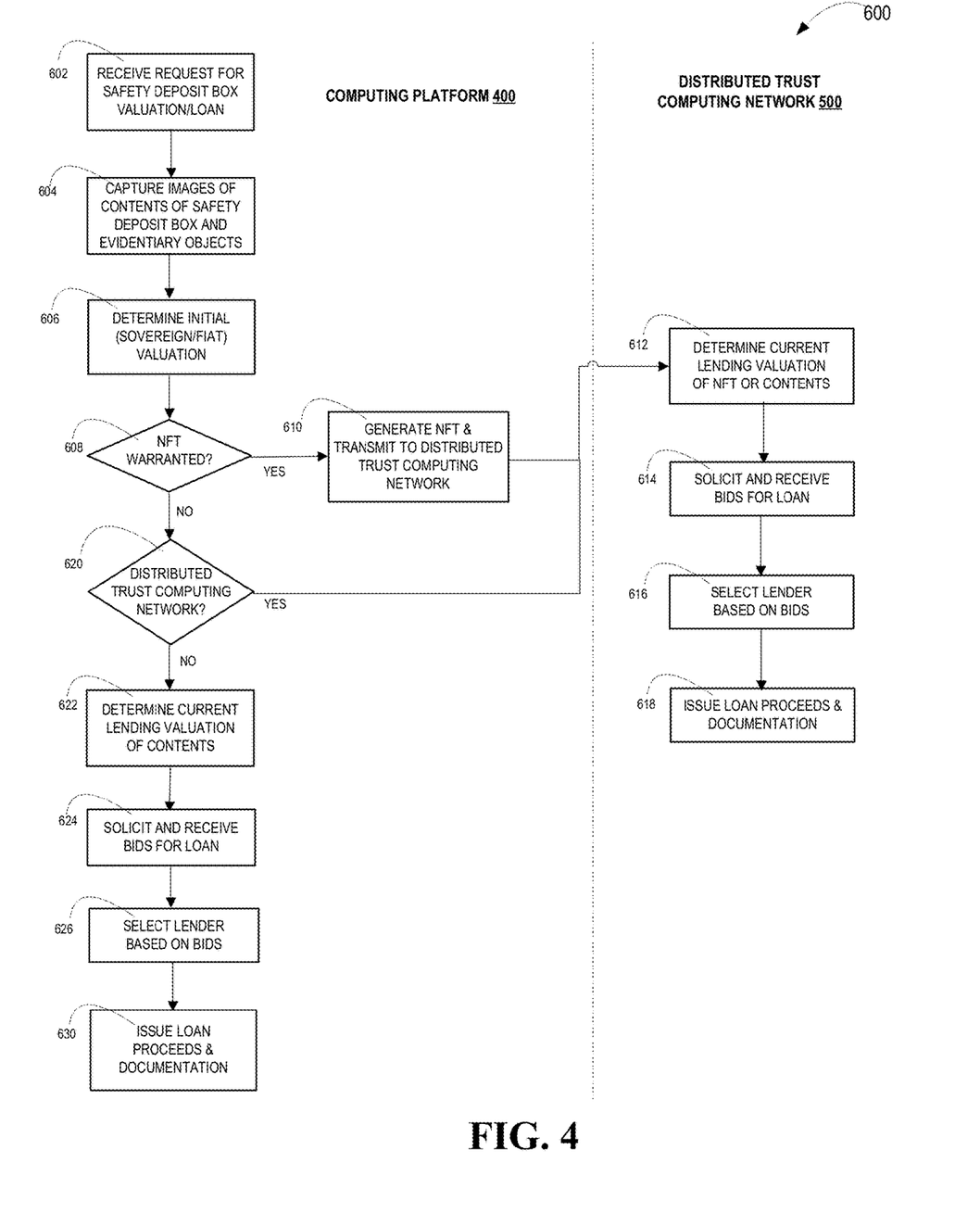
FIG. 4 is a flow diagram of a method for resource volume assessment of the contents of a secure container and resource advancement, in accordance with embodiments of the present invention.

Referring to FIG. 4, a flow diagram is presented of a method 600 for assessing the resource volume of contents of a secure container, in accordance with embodiments of the present invention. At Event 602, a request is received for secure container/safety deposit box content's valuation or, in some embodiments, a loan based on the valuation. At Event 604, images are captured of the contents of the secure container/safety deposit box and support evidentiary objects/documents (e.g., receipts, certification and the like).

At Event 606, an initial valuation is performed to determine a sovereign/FIAT value of at least a portion of contents (i.e., one or more of the physical objects contained in the secure container). As previously discussed, the initial valuation is performed by communicating the digital images of the contents of the secure container/safety deposit box and the evidentiary objects/documents to engine or the like implementing one or more object-recognition objects configured to identify the physical objects in the digital images and tag the physical objects in the images based on the resulting identification. The engine or the like is further configured to determine an initial valuation (i.e., the sovereign/FIAT valuation) based, at least, on the evidentiary objects/documents.

At Decision 608, a determination is made as to whether generation of an NFT is warranted (e.g., requested by the entity requesting the valuation and/or loan based on the valuation). If the determination is made that the NFT is warranted, at Event 610, at least one NFT (e.g., a single NFT for the entire contents of the secure container/safety deposit box or individual NFTs for each physical object of value in the secure container/safety deposit box) is generated using the digital image(s) of the contents of the secure container/safety deposit box and the initial value (i.e., sovereign/FIAT value) as inputs to the NFT-generating algorithms. Once generated, the NFT is transmitted to a distributed trust computing network 500.

At Event 612, a determination is made of the current lending value of the NFT based, at least, on (i) the current supply and/or demand of the physical objects, (ii) the current lending pool evaluation of the physical objects, and (iii) the initial value (i.e., sovereign/FIAT value). At Event 614, bids are solicited and received for the loan from lending entities (i.e., specific nodes associated with lenders that comprise the lender pool). At Event 616, a lender is selected based on the received lending bids and, at Event 618, proceeds of the loan are issued to the entity having an interest in the physical objects (e.g., holder of the secure container or another entity having a security interest in contents) and loan documentation is issued and authenticated by consensus of multiple nodes of the distributed trust computing network.

If the determination is made that the NFT is not warranted, at Event 610. A determination is made as to whether a distributed trust network is to be implemented for purposes of determining the current loan value and issuing the loan. If the determination is made that the distributed trust computing network is to be implemented, at Event 612, a determination is made of the current lending value of the physical objects in the images based, at least, on (i) the current supply and/or demand of the physical objects, (ii) the current lending pool evaluation of the physical objects, and (iii) the initial value (i.e., sovereign/FIAT value). At Event 614, bids are solicited and received for the loan from lending entities (i.e., specific nodes associated with lenders that comprise the lender pool). At Event 616, a lender is selected based on the received lending bids and, at Event 618, proceeds of the loan are issued to the entity having an interest in the physical objects (e.g., holder of the secure container or another entity having a security interest in contents) and loan documentation is issued and authenticated by consensus of multiple nodes of the distributed trust computing network.

If the determination is made that a distributed trust computing network is not to be implemented, at Event 622, a determination is made of the current lending value of the physical objects in the images based, at least, on (i) the current supply and/or demand of the physical objects, (ii) the current lending pool evaluation of the physical objects, and (iii) the initial value (i.e., sovereign/FIAT value). At Event 624, bids are solicited and received for the loan from lending entities (i.e., specific nodes associated with lenders that comprise the lender pool). At Event 626, a lender is selected based on the received lending bids and, at Event 630, proceeds of the loan are issued to the entity having an interest in the physical objects (e.g., holder of the secure container or another entity having a security interest in contents) and loan documentation is issued.

Figure 5:
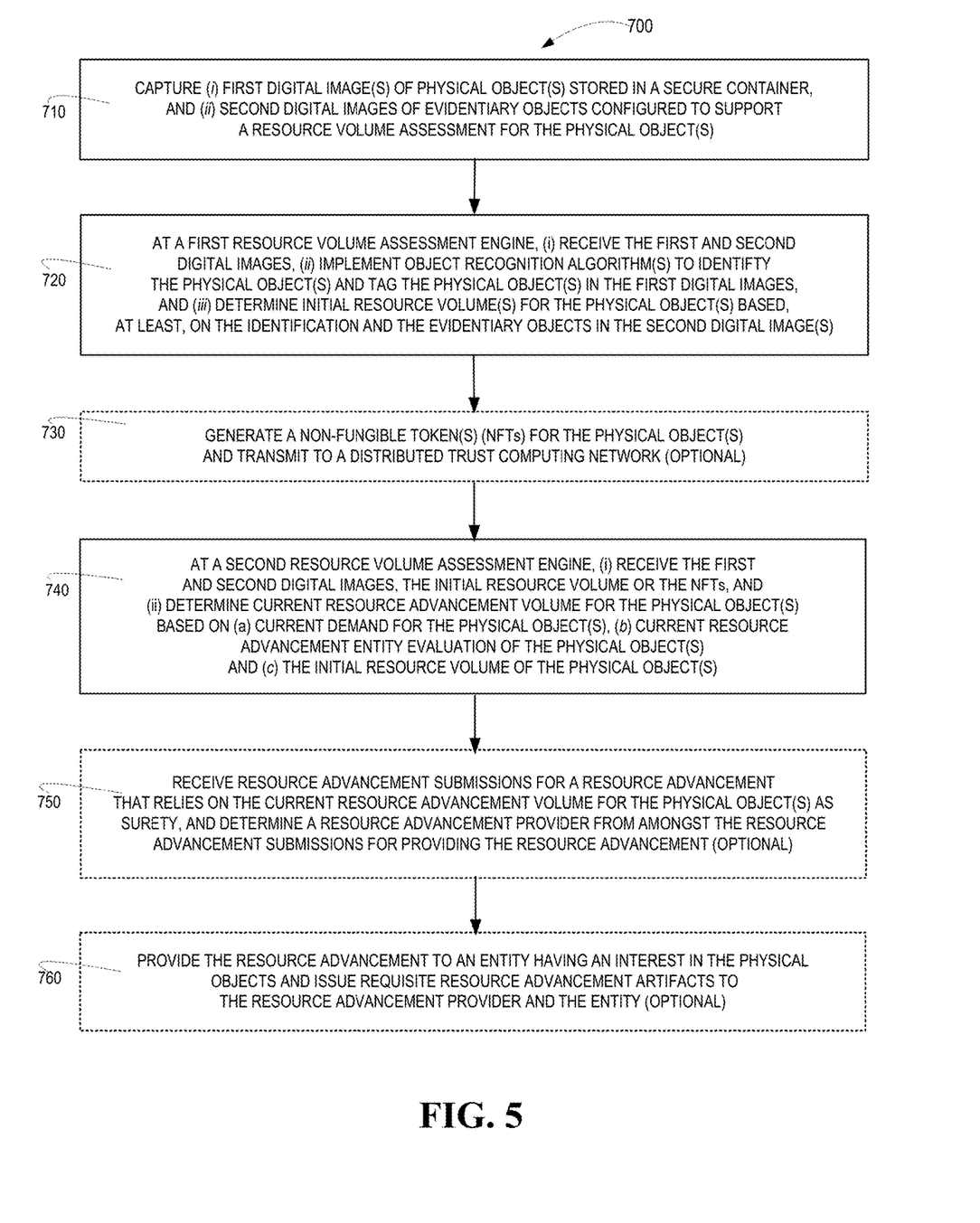
FIG. 5 is a flow diagram of a methodology for resource volume assessment of the contents of a secure container and resource advancement, in accordance with embodiments of the present invention.

Referring to FIG. 5, a flow diagram is presented of a method 700 for assessing resource volume of contents of a secure container, in accordance with embodiments of the present invention. At Event 710, first digital image(s) and second digital image(s) are captured. The first digital image (s) are of images of the contents (i.e., physical objects) stored in a secure container (i.e., safety locker/deposit box). The second digital images are of evidentiary objects/documents (e.g., receipts, certificates of authenticity, certificates of quality and the like) that support a resource volume assessment (sovereign/FIAT value assessment) of the contents/physical objects.

At Event 720, at a first resource volume assessment engine (i) the first and second digital images are received, (ii) one or more object-recognition algorithms are implemented to identify the physical objects in the first digital images(s) and tag the physical objects in the images with the corresponding identification, and (iii) initial resource volume(s) (e.g., sovereign/FIAT valuation) are determined for the contents or physical objects comprising the contents based, at least, on the evidentiary objects/documents in the second digital images.

At Optional Event 730, a Non-Fungible Token (NFT) is generated for the contents of the secure container or one or more physical objects comprising the contents. The NFT(s) are generated using the first digital image(s) and the initial resource volume(s) for the contents or one or more physical objects comprising the contents. Once generated, the NFT(s) are transmitted to a distributed trust computing network (e.g., HOLOCHAIN® or the like).

At Event 740, at a second resource volume assessment engine, which in some embodiments of the invention is executed by one or more nodes of a distributed trust network, (i) the first and second digital images and the initial resource volume(s) or, in other embodiments, the NFT(s) are received and (ii) current resource advancement volumes (e.g., loan valuations) are determined for the physical objects or the NFT based, at least on (i) current supply and/or demand of the physical objects, (ii) current resource advancement providers (e.g., pool of lenders) evaluation of the physical objects and (iii) the initial resource volume of the contents or one or more physical objects comprising the contents.

At Optional Event 750, which in some embodiments of the invention is executed by one or more nodes of a distributed trust network, (i) resource advancement submissions (e.g., loan bids) are received, in specific embodiments form nodes associated with a resource advancement provider (e.g., lender), for a resource advancement requested by an entity having an interest in the contents of the secure container and that relies on the contents or objects comprising the contents as surety/loan collateral, and (ii) a resource advancement provider is selected based on the resource advancement submissions for providing the resource advancement.

At Optional Event 760, which in some embodiments of the invention is executed by one or more nodes of a distributed trust network, the proceeds of the resource advancement are provided to the entity requesting the resource advancement (i.e., an entity having an ownership or security interest in the contents of the secure container) and resource advancement artifacts/documents are issued to the resource advancement provider and the entity. In those embodiments of the invention, in which a distributed trust computing network is implemented, the nodes of the network are configured to reach consensus on the resource advancement artifacts to verify their authenticity.

Thus, present embodiments of the invention intelligent assessment of the resource volume associated with objects stored in a secure container. In this regard, the invention not only provides for assessing the sovereign/FIAT resource volume of the contents of the secure container, but also provides an ongoing assessment of the current resource advancement volume for purposes of using the content as a surety in securing a resource advancement. As a result of the present invention, a secure container holder or entity having an interest in the contents of the secure container is able to take otherwise idle property (i.e., the contents/objects in the secure container) and use them to create a tradeable commodity (i.e., an NFT) and leverage resource liquidity based on the valuation of the NFT, the entire contents and/or individual objects in the safety locker box.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for assessing resource volume of contents stored in a secure container, the system comprising:
   a secure container including one or more physical objects stored in the secure container;
   an image-capturing apparatus configured to periodically capture (i) one or more first digital images of the one or more physical objects stored in the secure container, and (ii) one or more second digital images of evidentiary objects configured to support a resource volume assessment of at least one of the one or more physical objects;
   a distributed trust computing network comprising a plurality of decentralized nodes, each decentralized node having a second memory and at least one second processing device in communication with the second memory, wherein the second memory of the decentralized nodes is configured to store a distributed register comprising a plurality of data blocks that store data; and
   a computing platform including a first memory and one or more first computing device processors in communication with the first memory, wherein the first memory stores:
      a first resource volume assessment engine executable by at least one of the one or more first computing device processors to (i) receive the one or more first digital images and the one or more second digital images, (ii) implement one or more object recognition algorithms to identify the one or more physical objects in the one or more first digital images, (iii) tag the one or more physical objects in the one or more first digital images based on the identification, and (iv) determine at least one initial resource volume for the one or more physical objects based at least on the evidentiary objects in the one or more second digital images, a second resource volume assessment engine executable by at least one of the one or more first computing device processors to (i) receive the tagged one or more first digital images, the one or more second digital images, and the at least one initial resource volume for the one or more physical objects, (ii) determine at least one current resource volume for the one or more physical objects based at least on (a) current demand for the one or more physical objects, (b) current resource advancement entity evaluation of the one or more physical objects, and (c) the initial resource volume of the one or more physical objects, and (iii) track, over time, the at least one current resource volume for the one or more physical objects, and a Non-Fungible Token (NFT) generator engine executable by at least one of the one or more first computing device processors to (i) generate at least one NFT using at least a portion of an input file including (a) at least one of the one or more first digital images and (b) the at least one initial resource volume for the one or more physical objects, and (ii) transmit the at least one NFT to the distributed trust computing network, wherein the distributed trust computing network stores the at least one NFT as a data block within the distributed register.

2. The system of claim 1,
wherein the distributed trust computing network is configured to certify that the data stored in the data blocks is authentic and unaltered and wherein the at one second processing device of a first plurality of the decentralized nodes are configured to execute the second resource volume assessment engine to determine the at least one current resource volume for the one or more physical objects.

3. The system of claim 2, wherein the at least one second processing devices of the first plurality of the decentralized nodes of the distributed trust computing network are configured to execute the second resource volume assessment engine to determine the at least one current resource volume for each of the NFTs.

4. The system of claim 1, wherein the second memory of the distributed trust computing network stores a resource advancement submission and determiner engine that is executable by a second plurality of the decentralized nodes and is configured to (i) receive one or more resource advancement submissions, from decentralized nodes associated resource advancement providers, for a resource advancement that relies on the current resource volume for the one or more physical objects stored in the secure container as surety, and (ii) determine a resource advancement provider from amongst the one or more resource advancement submissions for providing the resource advancement.

5. The system of claim 4, wherein the second memory of distributed trust computing network stores a resource advancement issuance engine that is executable by at least one of the decentralized nodes and is configured to (i) provide the resource advancement to an entity having an interest in the physical objects stored in the secure container, and (ii) issue requisite resource advancement artifacts to the resource advancement provider and the entity.

6. The system of claim 1, wherein the second resource volume assessment engine is further configured to, in response to determining a decrease in resource volume for at least one of the physical objects, (iv) determine whether an outstanding resource advancement relying on the resource volume of at least one of the physical objects stored in the secure container as surety requires a demand for resources based on the decrease in resource volume.

7. A computer-implemented method for assessing resource volume of contents stored in a secure container, the computer-implemented method comprising:
capturing, by an image-capturing apparatus, (i) one or more first digital images of one or more physical objects stored in a secure container, and (ii) one or more second digital images of evidentiary objects configured to support a resource volume assessment of at least one of the one or more physical objects;
at a first resource volume assessment engine executed by one or more computing processor devices:
receiving the one or more first digital images and the one or more second digital images;
implementing one or more object recognition algorithms to identify the one or more physical objects in the one or more first digital images;
tagging the one or more physical objects in the one or more first digital images based on the identification;
determining at least one initial resource volume for the one or more physical objects based at least on the evidentiary objects in the one or more second digital images;
at a second resource volume assessment engine executed by the one or more computing processor devices:
receiving the tagged one or more first digital images, the one or more second digital images, and the at least one initial resource volume for the one or more physical objects;
determining at least one current resource volume for the one or more physical objects based at least on (a) current demand for the one or more physical objects, (b) current resource advancement entity evaluation of the one or more physical objects, and (c) the initial resource volume of the one or more physical objects;
tracking, over time, the at least one current resource volume for the one or more physical objects;
at a Non-Fungible Token (NFT) generator engine executed by the one or more computing processor devices:
generating at least one NFT using at least a portion of an input file including (i) at least one of the one or more first digital images and (ii) the at least one initial resource volume for the one or more physical objects; and
transmitting the at least one NFT to a distributed trust computing network; and
storing the at least one NFT as a data block within a distributed register of the distributed trust computing network.

8. The computer-implemented method of claim 7, wherein the second resource assessment engine is executed by at least one processing device in a plurality of decentralized nodes in the distributed trust computing network to determine the at least one current resource volume for the one or more physical objects.

9. The computer-implemented method of claim 7, wherein determining at least one current resource volume further comprises determining the at least one current resource volume for each of the NFTs.

10. The computer-implemented method of claim 8, further comprising:

at a resource advancement submission and determiner engine executed by at least one decentralized node from amongst the plurality of decentralized nodes of the distributed trust computing network:
- receiving one or more resource advancement submissions, from decentralized nodes associated resource advancement providers, for a resource advancement that relies on the current resource volume for the one or more physical objects stored in the secure container as surety; and
- determining a resource advancement provider from amongst the one or more resource advancement submissions for providing the resource advancement.

11. The computer-implemented method of claim 10, further comprising:

at a resource advancement issuance engine executed by at least one decentralized node from amongst the plurality of decentralized nodes of the distributed trust computing network:

providing the resource advancement to an entity having an interest in the physical objects stored in the secure container; and issuing requisite resource advancement artifacts to the resource advancement provider and the entity.

12. The computer-implemented method of claim 7, further comprising:

in response to determining a decrease in resource volume for at least one of the physical objects, determining whether an outstanding resource advancement relying on the resource volume of at least one of the physical objects stored in the secure container as surety requires a demand for resources based on the decrease in resource volume.

* * * * *